United States Patent
Hasty et al.

(10) Patent No.: US 12,079,894 B2
(45) Date of Patent: Sep. 3, 2024

(54) GUEST QUARTERS COORDINATION DURING MUSTER

(71) Applicant: Royal Caribbean Cruises Ltd., Miami, FL (US)

(72) Inventors: Joey Hasty, Miami, FL (US); Josh Nakaya, Glendale, CA (US)

(73) Assignee: Royal Caribbean Cruises, Ltd., Miami, FL (US)

(*) Notice: Subject to any disclaimer, the term of this patent is extended or adjusted under 35 U.S.C. 154(b) by 472 days.

(21) Appl. No.: 16/706,106

(22) Filed: Dec. 6, 2019

(65) Prior Publication Data
US 2021/0174466 A1 Jun. 10, 2021

(51) Int. Cl.
| | |
|---|---|
| G06Q 90/00 | (2006.01) |
| G01C 21/20 | (2006.01) |
| G05B 9/02 | (2006.01) |
| G05B 19/042 | (2006.01) |
| G08B 7/06 | (2006.01) |

(52) U.S. Cl.
CPC ......... *G06Q 90/205* (2013.01); *G01C 21/206* (2013.01); *G05B 9/02* (2013.01); *G05B 19/0428* (2013.01); *G08B 7/062* (2013.01); *G08B 7/066* (2013.01)

(58) Field of Classification Search
CPC ...... G06Q 90/205; G06Q 90/20; G08B 7/062; G08B 7/066; G01C 21/206; G05B 19/0428; G05B 9/02
See application file for complete search history.

(56) References Cited

U.S. PATENT DOCUMENTS

| | | | |
|---|---|---|---|
| 2016/0123741 A1* | 5/2016 | Mountain | G01C 21/206 701/533 |
| 2018/0089785 A1* | 3/2018 | Imoto | G01C 21/34 |
| 2018/0139569 A1* | 5/2018 | Padgett | H04W 4/029 |

OTHER PUBLICATIONS

Barsocchi P, Ferro E, La Rosa D, Mahroo A, Spoladore D. E-Cabin: A Software Architecture for Passenger Comfort and Cruise Ship Management, 2019, downloaded from: https://doi.org/10.3390/s19224978 (Year: 2019).*

* cited by examiner

*Primary Examiner* — Lynda Jasmin
*Assistant Examiner* — Ehrin L Pratt
(74) *Attorney, Agent, or Firm* — CRGO Global; Steven M. Greenberg

(57) ABSTRACT

Embodiments of the present invention provide a method, system and computer program product for guest quarters coordination during muster on a vessel. In an embodiment of the invention, a guest quarters coordination method during muster on a vessel includes initiating a muster event on a vessel and responding to the muster event, in each cabin on the vessel, by activating a television display in the cabin, retrieving a muster location assigned to the cabin and displaying the muster location on the television display.

6 Claims, 2 Drawing Sheets

GUEST QUARTERS COORDINATION DURING MUSTER

BACKGROUND OF THE INVENTION

Field of the Invention

The present invention relates to the field of muster management in an ocean-going vessel and more particularly to coordinating passenger muster in a cruise ship.

Description of the Related Art

Muster refers to the organized and pre-planned congregation of different passengers on an ocean-going vessel at different locations of the ocean-going vessel in response to, or in preparation for, a response to an emergency condition in the ocean-going vessel. Traditionally, in the context of a passenger cruise ship, a muster drill is performed at the beginning of the cruise before the cruise ship departs or shortly thereafter. During the muster drill, each individual passenger reports to an assigned muster station—a specific location on the vessel. A crew member then confirms the presence of each passenger expected to be present at the specific location during the muster drill so that all passengers may be accounted for in the event of an actual emergency and a resultant actual muster.

The muster process is particularly important because, with different clusters of passengers pre-positioned at specific, predetermined locations, an orderly evacuation of the vessel may be achieved if required, or at least all passengers can be accounted for and the location of the passengers managed relative to a location of an emergency condition aboard the vessel. Prior to an emergency, a muster drill is important as the muster drill introduces to each passenger the precise location at which the passenger is required to report in the event of an actual emergency as well as demonstrates important safety information such as the identification of life jackets and warning signals the guest might hear. Consequently, in light of the prospective frenetic activity of muster during an actual emergency, it is desirable to have confidence that the passengers each will be able to traverse the vessel to the assigned muster station.

Despite the desire for a chaos free muster, the reality remains that during an emergency condition—even a minor emergency—general confusion may arise simply owing to the complexity of size and architecture of a vessel and the mass movement of so many passengers to different locations within a short period of time. Indeed, during a muster event, whether a drill or actual, the resulting process can be confusing for some—particularly the elderly and children—both of whom often require additional assistance locating and moving towards assigned muster stations. The foregoing difficulties may be compounded when the muster event occurs during nighttime when passengers awake from sleep and may not be completely aware of unfamiliar surroundings. Crew members generally are trained to supply such assistance, but lapses remain possible.

BRIEF SUMMARY OF THE INVENTION

Embodiments of the present invention address deficiencies of the art in respect to muster on a vessel and provide a novel and non-obvious method, system and computer program product for guest quarters coordination during muster on a vessel. In an embodiment of the invention, a guest quarters coordination method during muster on a vessel includes initiating a muster event on a vessel and responding to the muster event, in each cabin on the vessel by activating a television display in the cabin, retrieving a muster location assigned to the cabin and displaying the muster location on the television display.

In one aspect of the embodiment, the method additionally includes remotely activating floor lighting in each cabin responsive to the muster event. In another aspect of the embodiment, the method additionally includes computing a navigation path from the cabin to the retrieved muster location, selecting one or more turn by turn directions for the path and displaying at least one of the turn by turn directives in the television display. In yet another aspect of the embodiment, the method additionally includes computing a navigation path from the cabin to the retrieved muster location, selecting landmark disposed within the path and displaying the landmark in the television display. In even yet another aspect of the embodiment, the method additionally, includes displaying a graphical image of the computed navigation path in the television display.

In another embodiment of the invention, a data processing system is adapted for guest quarters coordination during muster. The system includes a host computing platform including one or more computers, each with memory and at least one processor and a multiplicity of wireless access points positioned on a vessel and coupled to the host computing platform. The method additionally includes a guest quarters muster coordination module. The module includes computer program instructions configured for execution in the host computing platform to respond to a muster event, in each cabin on the vessel, by activating a television display in the cabin, retrieving a muster location assigned to the cabin and displaying the muster location on the television display.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for guest quarters coordination during muster for ocean-going vessels. In accordance with an embodiment of the invention, a each of a multiplicity of passengers on a vessel may be assigned to a muster station on the vessel by virtue of an assignment of a state room or guest quarters for each of the passengers, in so far as each such cabin is assigned to a muster station. Thereafter, during a muster event, a television present in the state room is accessed to cause the television to power on, an assigned muster station for a corresponding cabin determined, and a display presented on a display of the television with the assigned muster station. Optionally, path is computed as between the assigned state room or cabin and the assigned muster station and a graphical image of the path is presented on the display of the television. In this way, during the confusion of the muster event, facilitating information in respect to the muster event is presented in the display so as to reduce the confusion.

Figure 1:
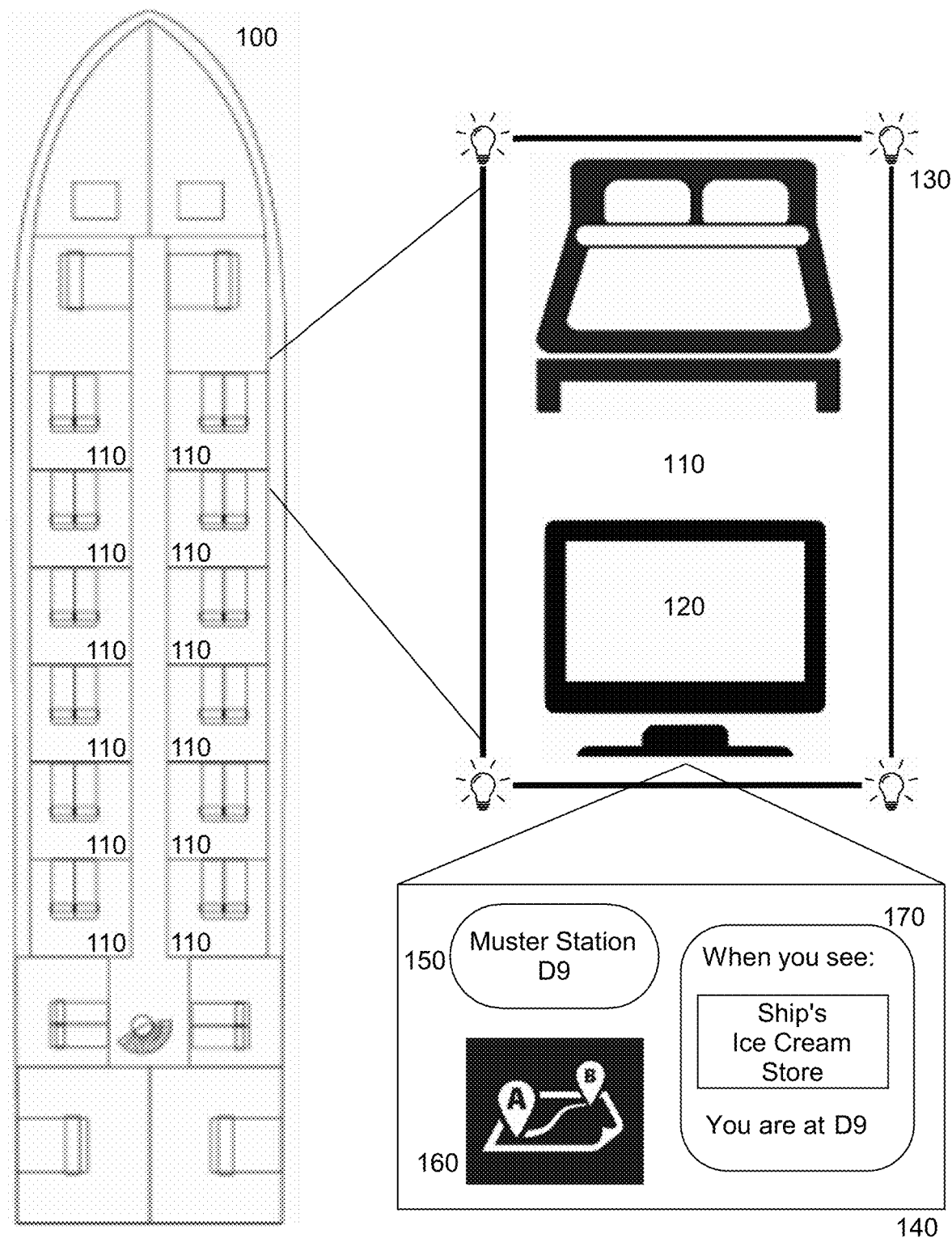
FIG. 1 is a pictorial illustration of a process for guest quarters coordination during muster for ocean-going vessels.

In further illustration, FIG. 1 pictorially illustrates a process for guest quarters coordination during muster for ocean-going vessels. As shown in FIG. 1, different state rooms, guest quarters, also known as cabins 110 of a vessel 100 are assigned to different passengers. Each of the state rooms 110 includes a television 120 and, optionally, floor lighting 130. During a muster event, for each of the state rooms 110, an assigned muster station on the vessel 100 retrieved. Then, a display 140 of the television 120 in the state room 110 of the corresponding passenger or passengers is presented to include an image 150 of the assigned muster station. Optionally, the floor lighting 130 is activated to illuminate the floor of the state room 110. As another option, a path is computed as between the state room 110 of the corresponding passenger or passengers, and the assigned muster station and an image 160 of the path also is included in the display 140. Finally, a landmark known to exist along the computed path is identified, such as a store or restaurant on the vessel, and an image 170 of a reference to the landmark is included in the display 140.

Figure 2:
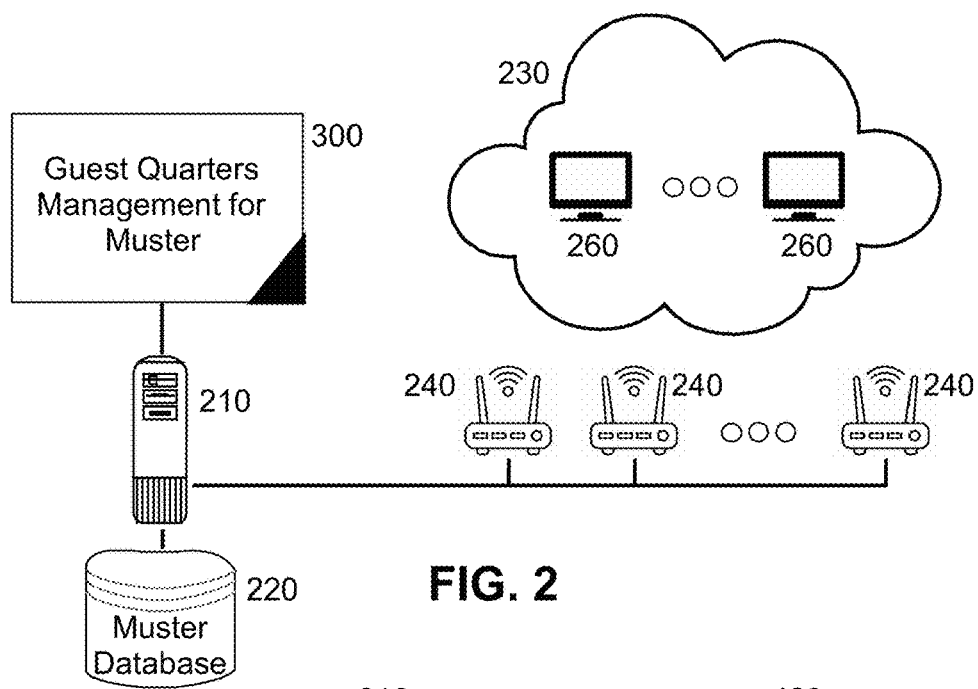
FIG. 2 is a schematic illustration of a data processing system configured for guest quarters coordination during muster for ocean-going vessels; and, FIG. 3 is a flow chart illustrating a process for guest quarters coordination during muster for ocean-going vessels.

The process described in connection with FIG. 1 may be implemented within a data processing system. In further illustration, FIG. 2 schematically shows a data processing system configured for guest quarters coordination during muster for ocean-going vessels. The system includes a host computing system 210 that includes one or more computers, each with memory and at least one processor. The host computing system 210 is communicatively coupled to an array of wireless access points 240 each providing a wireless computer communications network 250 in which one or more televisions 260, each disposed in a corresponding state room on the vessel, can communicate with the host computing system 210. Finally, the system includes a guest quarters management module 300 including computer program instructions executing in the host computing platform 210.

The computer program instructions during execution respond to a muster event by retrieving from the muster database 220 for each state room in the vessel, an assigned muster station for the occupying passengers. The computer program instructions additionally retrieve a network address of one of the televisions 260 disposed within the state room. The computer program instructions further transmit for display in the one of the televisions 260, imagery indicating the assigned muster station. Finally, the computer program instructions, for each state room in the vessel, compute a path between the state room and the assigned muster station and transmit the path to the one of the televisions 260 for display therein. Optionally, the computer program instructions retrieve a landmark known to be proximate to the path and also transmit an image of the landmark to the one of the televisions 260 for display therein.

Figure 3:
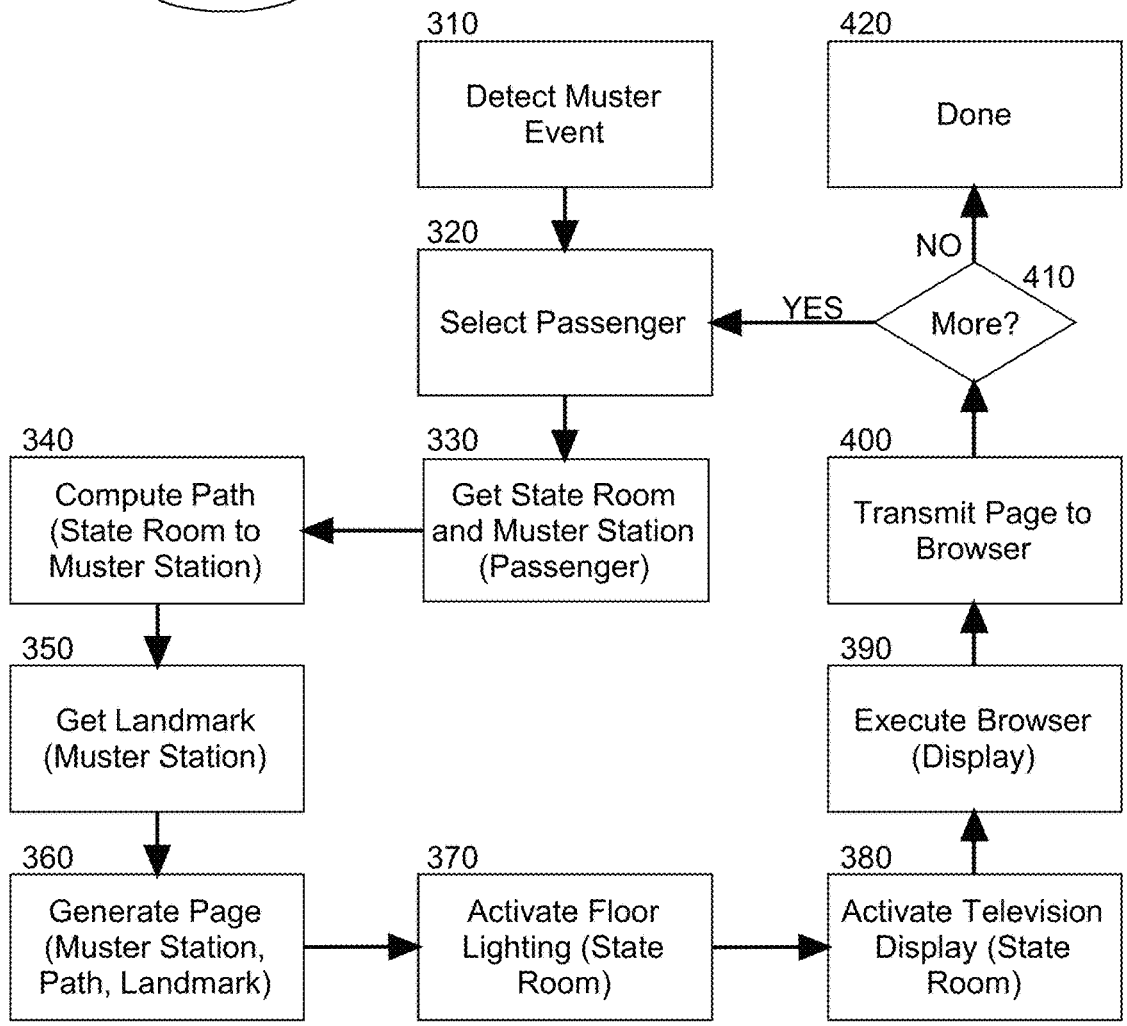

In even further illustration of the operation of the guest quarters management module 300, FIG. 3 is a flow chart illustrating a process for guest quarters coordination during muster for ocean-going vessels. Beginning in block 310, a muster event on the vessel is detected. Then, in block 320 a passenger on the vessel is selected for processing and in block 330, a state room and muster station assigned to the state room is determined. In block 340, a path between the state room and muster station is computed and in block 350, a landmark proximate to the path en route to the muster station is identified. Then, a Web page is generated including each of an image of the assigned muster station, an image of the path and an image of the landmark. In block 370, a signal is transmitted to the floor lighting in the state room to activate the floor lighting.

As well, a signal is transmitted to the television in the state room to power on in block 380 along with a communicatively coupled computing device. Then, in block 390 a Web browser is executed in the communicatively coupled computing device in connection with the television and in block 400, the generated Web page is transmitted to the communicatively coupled computing device for display in the television. Finally, in decision block 410, it is determined if additional passengers remain to be processed. If so, the process repeats in block 320 with the selection of a new passenger. But, when it is determined in decision block 410 that no further passengers remain to be processed, the process ends in block 420.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A guest quarters coordination method during muster on a vessel, the method comprising:
    initiating a muster event on a vessel, the muster event requiring each individual passenger on the vessel to report to a pre-assigned muster station at a specific location on the vessel; and,
    responsive to the muster event, in each cabin on the vessel, activating a television display in the cabin, retrieving a muster location assigned to the cabin the muster location specifying a location on the vessel corresponding to the pre-assigned muster station for the cabin, computing a navigation path from the cabin to the retrieved muster location, selecting one or more turn by turn directions for the path, selecting landmark disposed within the path and displaying in the television display each of the muster location, a graphical image of the computed navigation path, at least one of the turn by turn directives and an image representative of the landmark.

2. The method of claim 1, further comprising remotely activating floor lighting in each cabin responsive to the muster event.

3. A data processing system adapted for guest quarters coordination during muster, the system comprising:
    a host computing platform comprising one or more computers, each with memory and at least one processor; and
    a guest quarters muster coordination module comprising computer program instructions configured for execution in the host computing platform, the instructions responding to a muster event, in each cabin on the vessel, the muster event requiring each individual passenger on the vessel to report to a pre-assigned muster station at a specific location on the vessel, by activating a television display in the cabin, retrieving a muster location assigned to the cabin the muster location specifying a location on the vessel corresponding to the pre-assigned muster station for the cabin, computing a navigation path from the cabin to the retrieved muster location, selecting one or more turn by turn directions for the path, selecting landmark disposed within the path and displaying in the television display each of the muster location, a graphical image of the computed navigation path, at least one of the turn by turn directives and an image representative of the landmark.

4. The system of claim 3, wherein the instructions further perform remotely activating floor lighting in each cabin responsive to the muster event.

5. A computer program product for guest quarters coordination during muster on a vessel, the computer program product including a computer readable storage medium having program instructions embodied therewith, the program instructions executable by a device to cause the device to perform a method including:
    initiating a muster event on a vessel, the muster event requiring each individual passenger on the vessel to report to a pre-assigned muster station at a specific location on the vessel; and,
    responsive to the muster event, in each cabin on the vessel, activating a television display in the cabin, retrieving a muster location assigned to the cabin the muster location specifying a location on the vessel corresponding to the pre-assigned muster station for the cabin, computing a navigation path from the cabin to the retrieved muster location, selecting one or more turn by turn directions for the path, selecting landmark disposed within the path and displaying in the television display each of the muster location, a graphical image of the computed navigation path, at least one of the turn by turn directives and an image representative of the landmark.

6. The computer program product of claim 5, wherein the method further comprises remotely activating floor lighting in each cabin responsive to the muster event.

* * * * *